United States Patent [19]
Brown

[11] 3,925,140
[45] Dec. 9, 1975

[54] FABRICATING APPARATUS FOR TWIN-SHEETS

[75] Inventor: Gaylord W. Brown, Beaverton, Mich.

[73] Assignee: Koehring Company, Milwaukee, Wis.

[22] Filed: Mar. 16, 1973

[21] Appl. No.: 341,850

[52] U.S. Cl. .............. 156/382; 156/359; 156/499; 425/383
[51] Int. Cl.² ........................................ B32B 31/26
[58] Field of Search .......... 156/285, 382, 362, 363, 156/364, 366, 499, 500, 358, 359; 425/185, 383, 384, 388, 156

[56] References Cited
UNITED STATES PATENTS

| | | | |
|---|---|---|---|
| 3,398,434 | 8/1968 | Alesi et al. | 425/384 |
| 3,583,036 | 6/1971 | Brown | 425/185 |
| 3,597,799 | 8/1971 | Earle | 425/384 |
| 3,779,687 | 12/1973 | Alesi | 425/384 |
| 3,783,078 | 1/1974 | Brodhead | 156/382 |

Primary Examiner—Caleb Weston

[57] ABSTRACT

Apparatus and methods for fabricating a hollow plastic object from a pair of heat-fusible, thermoplastic sheets which are serially moved in a common horizontal plane from a heating station to a mold mechanism at a forming station. At the forming station, one of the sheets is received by a mold which is then moved vertically to move the sheet out of the plane to a position juxtaposed with a following sheet when the latter arrives at the forming station. At least one of the sheets is differential pressure molded after arrival at the forming station and the sheets are then vertically moved together and fused to form the object.

3 Claims, 9 Drawing Figures

FABRICATING APPARATUS FOR TWIN-SHEETS

BACKGROUND OF THE INVENTION

This invention relates to differential pressure forming methods and apparatus, and more particularly to an apparatus for, and a method of, forming a hollow object in a pair of sheets of thermoplastic material which are successively delivered to a forming station.

Twin-sheet thermoforming apparatus of the type disclosed in the present assignee's U.S. Pat. No. 3,583,036, granted June 18. 1971, includes sheet supporting carriages which support the sheets to be joined in superposed relation as they move between a heating station and a forming station.

In another type of two-sheet thermoforming machine, such as that disclosed in the present assignee's copending patent application Ser. No. 268,883, now U.S. Pat. No. 3,787,158, filed in the U.S. Patent Office on July 3, 1972, the plastic sheets are concurrently moved in opposite directions and at different levels toward and away from a forming station.

An object of the present invention is to provide a twin-sheet, differential pressure thermoforming machine wherein heat fusible, deformable, thermoplastic sheets may be successively delivered in a common plane path to a forming station where a configuration is molded in at least on of the sheets and the sheets are thereafter fused together to form an object.

Another object of the present invention is to provide twin-sheet thermoforming apparatus of the character described which includes a sheet supply system for serially supplying deformable, synthetic plastic sheets in a common plane circuit to the forming station, Still another object of the present invention is to provide differential pressure, twin-sheet thermoforming apparatus having a load-unload station at which a pair of sheets used to form an object are successively loaded on carriages successively moving past the station, and at which an object formed in the sheets is subsequently removed from one of the carriages at the load-unload station.

Another object of the present invention is to provide double-sheet, differential pressure forming methods and apparatus for successively moving deformable sheets to a forming station, then moving one of the sheets out of the path of travel to a position juxtaposed with a following sheet when it is moved to the forming station, and then fusing the sheets together to form the object.

Machines of the type disclosed in the aforementioned patent and patent application are capable of forming objects in pairs of plastic sheets of differing thicknesses. The thicker sheets must be subjected to heat, from a given heating source, for a longer period of time than the thinner sheets. If the thinner sheets are subjected to the same heat as that required to prepare the thicker sheets, the thinner sheets will lose their strength and excessively sag. In the apparatus disclosed in the referenced patent, the upper and lower sheets must be maintained at the heating station for the same length of time. Thus, the heating of one sheet is always related to the heating of another sheet. It is a further object of the present invention to provide double-sheet differential pressure forming apparatus for serially moving sheets from a heating station to a forming station and heating the sheets independently of each other.

Other objects and advantages of the present invention will become apparent to those of ordinary skill in the art as the description thereof proceeds.

SUMMARY OF THE INVENTION

Apparatus for fabricating a hollow object from a pair of deformable, thermoplastic sheets comprising the steps of: frame means with a heating station and a forming station downstream of the heating station; carrier means for serially moving first and second deformable, thermoplastic sheets from the heating station to the forming station; means for heating the first and second sheets at the heating station; and means for moving the first sheet away from the carrier means when the first sheet is at the forming station to a position in which it will be juxtaposed with the second sheet when the latter is moved to the forming station, for applying a differential pressure to opposite sides of at least one of the sheets to form a shape therein, and for clamping the juxtaposed sheets together to fuse the sheets and form the object.

The present invention may more readily be understood by reference to the accompanying drawings, in which.

Figure 1:
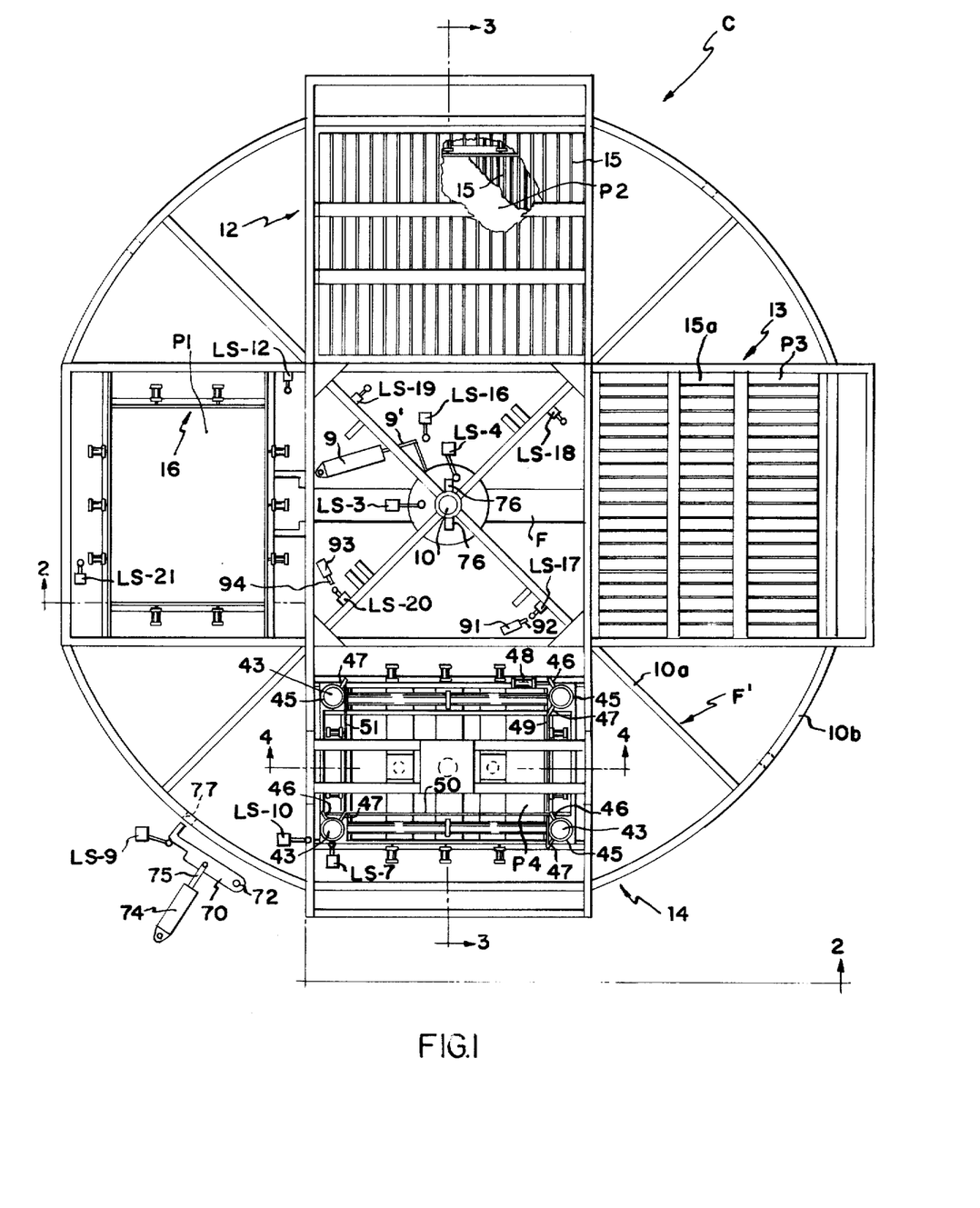
FIG. 1 is a top plan view of a rotary thermoforming machine constructed according to the present invention, part of the sheet heating apparatus being broken away to illustrate the underlying carriage.

Referring now more particularly to the accompanying drawings, and in the first instance particularly to FIG. 1, a rotary plastic sheet supporting carrier or turntable C is mounted for rotary, indexing movement on a fragmentarily illustrated, stationary frame F by a central shaft 10 journaled in the frame F in the usual manner. The turntable C includes a circular, spoked disc F' having radial spokes 10a fixed to the central shaft 10 and mounting an annular rim 10b. The turntable C mounts four circuitously arranged sheet supporting, clamp frame assemblies, generally designated 16, for gripping the edges of deformable webs or sheets of synthetic plastic, thermoplastic sheets P1, P2, P3 and P4 which may be on the order of 36 to 48 inches in size. The sheets P2 and P4 are lighter gauge sheets which typically may be 0.200 inches thick, and the sheets P1 and P3 are heavier gauge material, on the order of, for example, 0.250 inches in thickness. The clamp frame assemblies, generally designated 16, are of the same character as the clamp frame assemblies disclosed in the aforementioned patent except that they are used in inverted position, and they each clamp a single sheet or web of synthetic plastic material instead of a pair of such sheets. The clamp frame assembly 16 will not be described in detail in view of their full disclosure in the aforementioned patent. As usual, however, they comprise a pair of juxtaposed frames 23 and 24 (see FIG. 4). Each of the frames 24 is made up of four separate sections in rectangular formation which are pivotally mounted to swing downwardly and outwardly to release the plastic sheet held therein upon retraction of the piston rods 25 of a plurality of conventional, double acting, fluid pressure operated clamp cylinders 26.

Suitable synthetic plastic sheets which may be thermoformed in a manner to be described, are polystyrene, polyethylene and polypropylene, but it is contemplated that various thermoplastic materials may be thermoformed in the manner indicated and then assembled to form parts which consist of upper and lower sheets thermoformed to desired configurations. The apparatus constructed according to the present invention is particularly useful for forming large size containers of various types in various industries, such as holding tanks for the recreational vehicle industry, and may be also used to form such diverse products as hollow, plastic shutters and pallets.

Provided on the frame F is a loading-unloading station, generally designated 11, first and second sheet heatng stations, generaly designated 12 and 13, and a forming and assembly station, generally designated 14. A frame supported, double acting, solenoid actuated, spring returned, cylinder 9 is provided for indexing the turntable C to successively move the sheets P1 – P4 to the various stations. The clamped sheets P1 – P4 are successively incrementally indexed by the turntable C from the loading-unloading station, generally designated 11, between vertically spaced banks of heaters 15 and 15a at the first and second sheet heating stations 12 and 13, respectively, and then to a position between upper and lower molds 19 and 20 at the forming station 14. Conventional geneva or other apparatus couples the piston rod 9' of cylinder 9 to the turntable disc shaft 10 to index the turntable 90° each time the piston rod is extended.

At the loading-unloading station 11, a sheet supply carrier or table 27 is acutated by the piston rod 28 of a conventional single-acting, solenoid actuated, spring returned fluid pressure operated cylinder 29 for vertical movement between a lowered, sheet receiving position and a raised, sheet discharging position adjacent a sheet clamp frame assembly 16. Frame supported, vertically disposed sheet guide rods 30 are provided so that the plastic sheet becomes automatically centered in proper position on the table 27 when the table 27 is in lowered position beneath the level of the guides 30 and the operator places the plastic sheet thereon.

Figure 2:
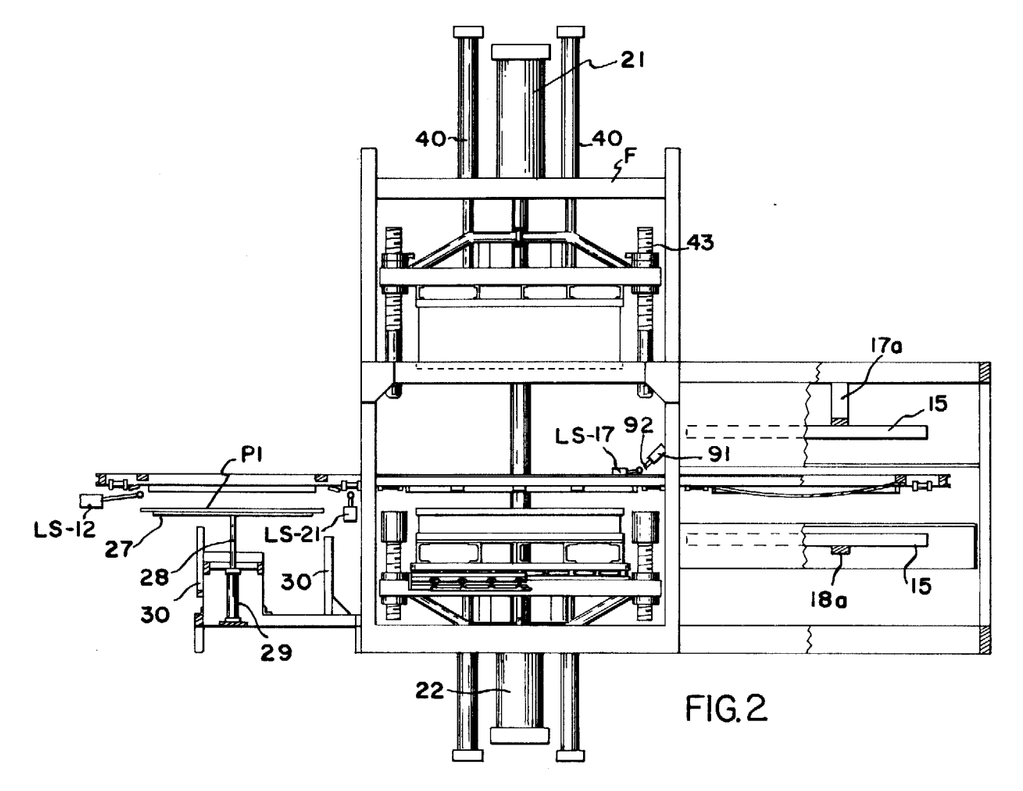
FIG. 2 is a partly sectional, front elevational view, taken on the line 2—2 of FIG. 1, part of the machine being broken away to more clearly illustrate a portion of the sheet heating apparatus.

In FIG. 2, the frame clamp bars 24 are shown swung to a plastic sheet releasing position so as to receive the sheet P1 which is being raised into position to be clamped by the clamp frame 16 at the loading-unloading station 11 (see FIG. 2). The operator alternately supplies sheets of thin and heavier gauge, for exampe, on the order of 0.200 thousandths and 0.250 thousandths, respectively, for a purpose which will later become apparent. When the table 27 is raised to its uppermost position in which the plastic sheet engages the upper frame part 23 of the clamp frame assembly 16, a limit switch LS-12 is tripped and the cylinders 26 are actuated to pivot the clamp frame elements 24 and clamp the sheet P1 between upper and lower frame parts 23 and 24, respectively, in the manner indicated in FIG. 4.

At the heatinng station 12, conventional resistance type, elongate heating elements 15 are supported on the frame F by frame structure 17 and 18 above and below the rotary path of the four clamp frame assemblies 16. The heater elements 15 comprise quartz tubes of the type manufactured by E. L. Weigand Company of New Jersey, or General Electric Company. The quartz heaters 15 are "flashed" for a very short period, i.e., 10 seconds, when the thin sheets P2 and P4 are at the first heating station 12 and are maintained energized for a longer period when thicker sheets P1 and P3 are at the first heating station 12. At the heating station 13, conventional infra-red type, elongate heating elements 15a are supported on the frame F by frame structure 17a and 18a. The infra-red heaters 15a are intermittently operated for a portion of the total time the sheets are at the second heating station 13.

At the forming station 14, upper and lower mold members 19 and 20, respectively (see FIG. 4), are mounted so as to be vertically moved by conventional, double acting, fluid pressure operated cylinders 21 and 22, respectively. The lower mold raising cylinder 22 is solenoid actuated on both the upstroke and return, but the upper mold lowering cylinder 21 is solenoid actuated to the extend position and is spring returned to the retracted or raised position.

Figure 4:
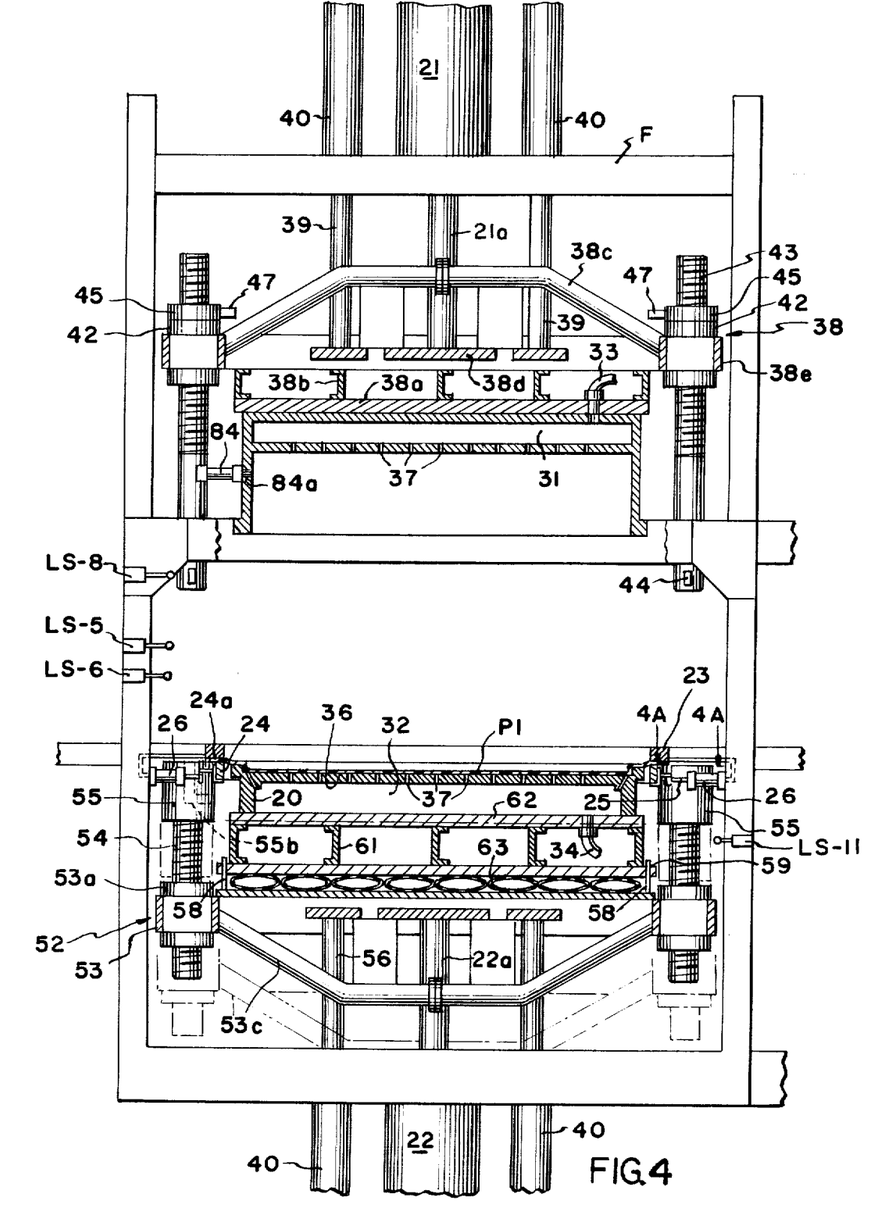
FIG. 4 is an enlarged, vertical sectonal view, taken on the line 4—4 of FIG. 1, particularly illustrating an upper mold in a raised removed position and a lower mold in a raised sheet-engaging position, forming a shape in a sheet at the forming station.
Figure 4A:
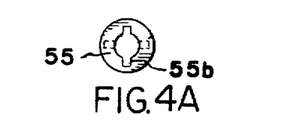
FIG. 4A is a fragmentary top plan view of a platen locking cylinder, taken along the line 4A—4A of FIG. 4.
Figure 5:
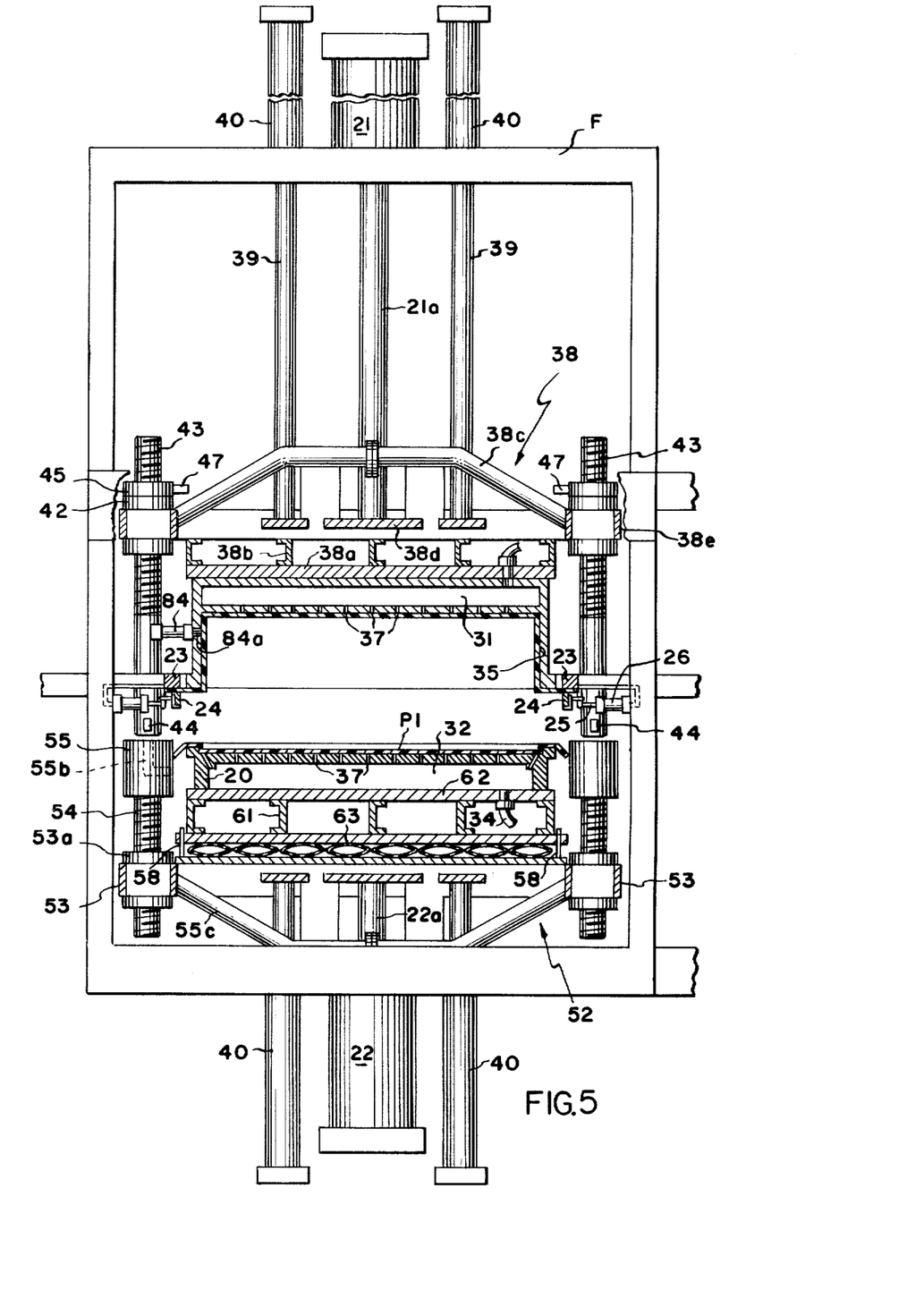
FIG. 5 is a view similar to FIG. 4, showing the lower mold carrying a previously molded sheet in a lowered dwell position and the upper mold in a lowered forming position, molding a shape in another sheet of plastic which has been subsequently indexed to the forming station.

As FIGS. 4 and 5 both particulalry indicate, the upper and lower molds 19 and 20 are provided with vacuum manifolds 31 and 32, respectively, which communicate respectively with vacuum source lines 33 and 34. The mold cavities 35 and 36 of molds 19 and 20, respectively, are provided with ports 37 communicating with the manifolds 31 and 32, respectively. As particularly indicated in FIG. 4, the upper mold 19 is supported on an upper platen, generally designated 38, which incldes side rails 38a, spanned by platen brace rods 38c and channel plates 38b. The channel plates 38b are sandwiched between a mold plate 38a, fixed to the upper mold 19, and a mold plate 38d fixed to the piston rod 21a of the cylinder 21. The upper platen 38 mounts guide rods 39 that are received in cushioning clinders 40 secured to the frame structure F. The upper platen 38 supports fixed nuts 42, which threadedly receive lock shafts 43, having locking lugs 44 at their lower ends. As FIG. 1 particularly indicates, four such lock shafts 43 are provided and are revolved 90° in unison by collars 45 which are fixed thereto to achieve a locking operation in a manner which will be described.

A pair of lugs or ears 46 and 47 (FIG. 1) are fixed to each collar 45. A solenoid controlled, double acting, fluid pressure operated cylinder 48 is provided on the upper platen 38 for rotating the vertical platen locking shafts 43 in unison via a linkage system including a link 49 pivotally connected at its ends to the ears 47 of the collars 45 at the right end of the assembly in FIG. 1, and a link 50 pivotally connected at its ends to the ears 46 of the radially outermost collars 45. Finally, a link 51 is also pivotally connected at its ends to the ears 47 on the collars 45 at the left end of the mold station as viewed in FIG. 1.

As FIG. 4 also indicates, the lower mold 20 is supported by a lower platen, generally designated 52, which includes side frame members 53, spanned by brace rods 53c, supporting fixed nuts 53a that receive vertical, threaded rods 54 having heads 55 provided with key-hole openings 55a for receiving the platen locking shafts 43 and lugs 44. The inner ends of the key-hole openings include offset portions 55b (FIG. 4) which receive the logs 44 when the lock shafts 43 are revolved 90° to lock the platens together.

The lower platen 52 includes a cross bar 52f mounted on the piston rod 22a of the lower fluid pressure operated clinder 22 and carries guide rods 56 which are received in cushioning cylinders 40 fixed to the frame structure F. Spanning the side rails 53 of the lower platen 52 is a lower pressure plate 57 which, at its four corners, mounts vertical guide rods or pins 58 which are freely and slidably received in openings 59 provided in an upper pressure plate 60. The upper pressure plate 60 is connected to the underside of the lower mold 20 via channel plates 61 and a manifold plate 62.

Figure 3:
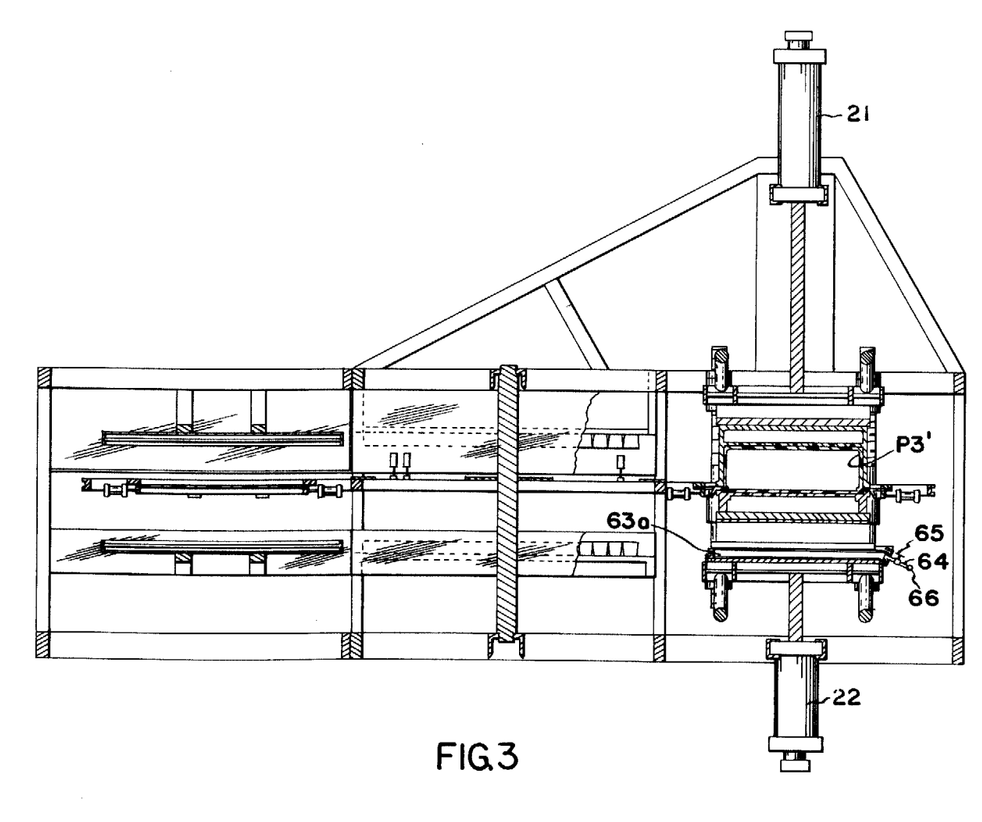
FIG. 3 is a transverse sectional view, taken on the line 3—3 of FIG. 1.
Figure 6:
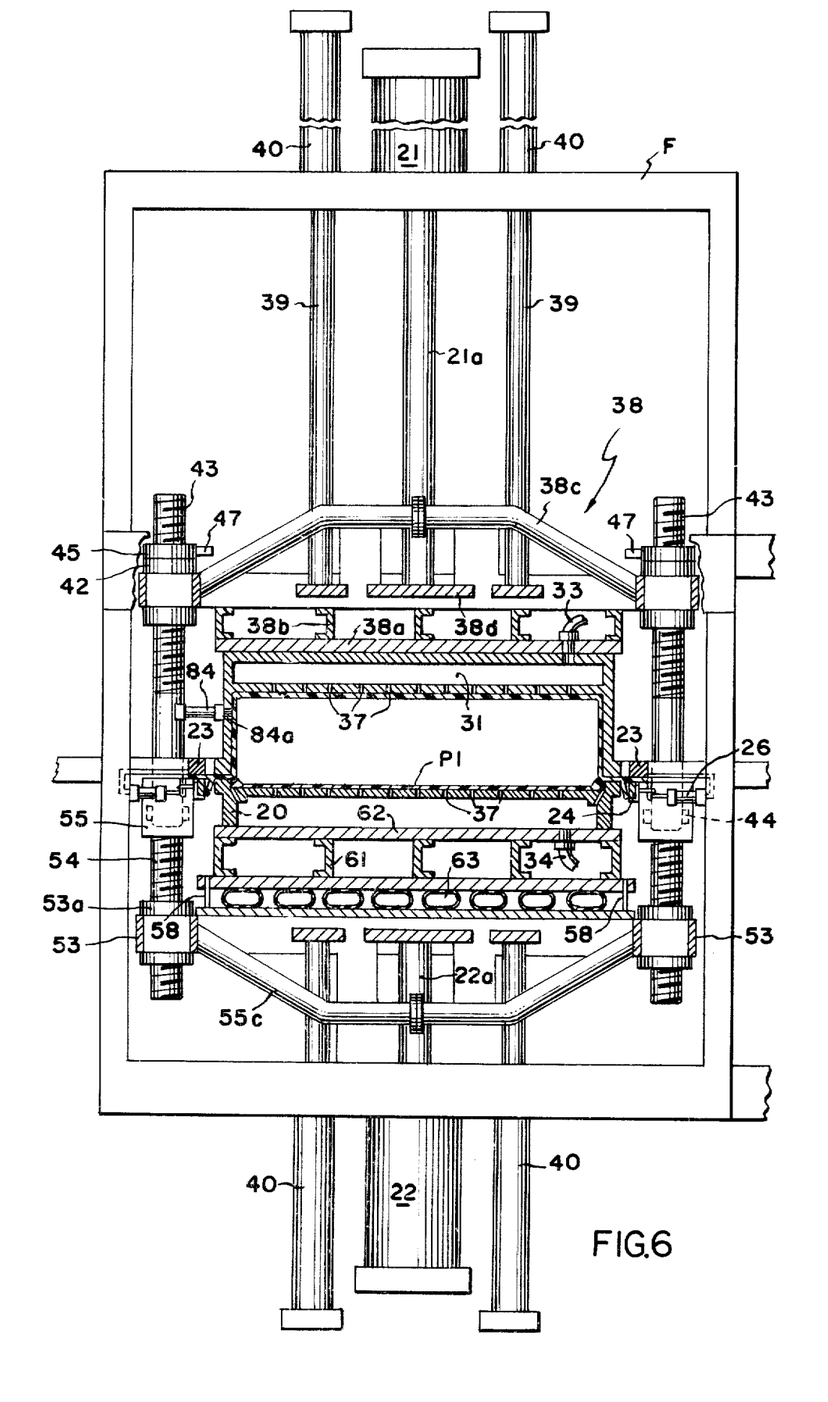
FIG. 6 is an enlarged vertical, sectional view similar to FIG. 5, illustrating the upper and lower molds in closed position, the lower mold being illustrated in a position elevated with respect to the lower mold support platen, in which the upper and lower sheets are fused together.

Apparatus is provided for moving the lower mold 20 upwardly relative to the lower platen 52, when the sheets are clamped between the molds 19 and 20, and includes a series of individual hose-like, air-expansible bladders 63, provided between the relatively movable pressure plates 57 and 60. Plainly, when air is admitted to the bladders 63, the pressure plate 60 and lower mold 20 will immediately be forced upwardly to pinch the upper and lower sheets clamped between the molds 19 and 20 at the forming station to a reduced thickness (see FIG. 6). It is to be understood that the bladders 63 are formed of a flexible, collapsible material such as a resilient fabric, which normally is in the semi-collapsed condition shown in FIG. 4. Rigid end plates 63a are provided for the inflatable tubes 63 and their air pressure supply tubes 64 lead into one end of each expansible tube 63 through a rigid end plate 63a, as shown in FIG. 3. Individual valves 65 for the tubes 64 permit each of the tubes 63 to be shut down, if desired, when they are not necessary to the mold raising operation and there is no need for air from a manifold 66 to be communicated to them via their supply tube 64.

To insure that the sheet supporting carriages 16 are halted in the identical position at the forming station each time the turntable C is indexed, apparatus for locking the turntable C in the various fully indexed position is provided and comprises a rim lock 70 pivotally mounted on a frame supported shaft 72 for movement between the unlocked position, illustrated in FIG. 1, and a rim engaging position received in any one of a plurality of recesses 77 provided in the rim 10b of the turntable C. To swing the lock 70, a solenoid actuated, spring returned, fluid pressure operated control cylinder 74 is provided including a piston rod 75 coupled to the pivoted rim lock 70. A limit switch LS-9 is tripped by the rim lock 70 in the unlocked position.

A plurality of limit switches are provided for controlling the operation of the machine and include a pair of limit switches LS-3 and LS-4 mounted 90° apart on the frame F in position to be alternately tripped by a pair of 180° spaced paddles 76 fixed to the turntable shaft 10.

The upper mold 19 includes a molding pressure needle 84 which is movable through an aperture 84a in the mold sidewall to pierce a sheet of plastic drawn into the upper mold cavity 35 and introduce pressurized air into the deformed sheet for assisting it into intimate conformity with the upper mold cavity 35.

Top and bottom "platen extend" limit switches LS-5 and LS-6 (FIG. 4) are supported on the frame to be tripped by the upper and lower molds 19 and 20, respectively, in their closed molding positions, illustrated in FIG. 3. A platen lock limit switch LS-7 is mounted on the upper platen 38 to be tripped when the lock 44 moves to platen locking position. A rim lock open limit switch LS-9 is mounted on the frame F in position to be tripped when the rim lock 70 is retracted from the rim 10b. A platen unlock limit switch LS-10 is mounted on the upper platen 38 in position to be tripped when the platen locks 44 move to a platen unlocking position aligned with the key-hole 55b in the heads 55 supported on the lower platen 53.

A "bottom platen extend" limit switch LS-11 (FIG. 4) is mounted on the frame F in position to be tripped when the bottom mold 20 is moved to the molding position illustrated in FIG. 3. A load table extend limit switch LS-12 is mounted on the frame F at the load station 11 in position to be tripped when the sheet supply or load table 27 is extended from the position illustrated in FIG. 2 to a raised position at a clamp frame assembly 16.

A plurality of "clamp frame" limit switches LS-17, LS-18, LS-19 and LS-20 are supported on the turntable C in position to be tripped when the sheets P1 - P4, respectively, reach the forming station 14. Apparatus for tripping the llimit switches LS-17 through LS-20 comprises a cylinder 91, at the forming station 14, having a piston rod 92 which extends into the path of the limit switches LS-17 and LS-20. The limit switches LS-17 through LS-20 are also successively tripped at the load-unload station 11 by the piston rod 94 of a double acting, solenoid actuated, fluid pressure operated cylinder 93 which is selectively energized. A sheet supply control limit switch LS-21 is mounted in the turntable C in position to be tripped when the frame 16 opens at the load-unload station.

THE CONTROL CIRCUIT

Figure 7:
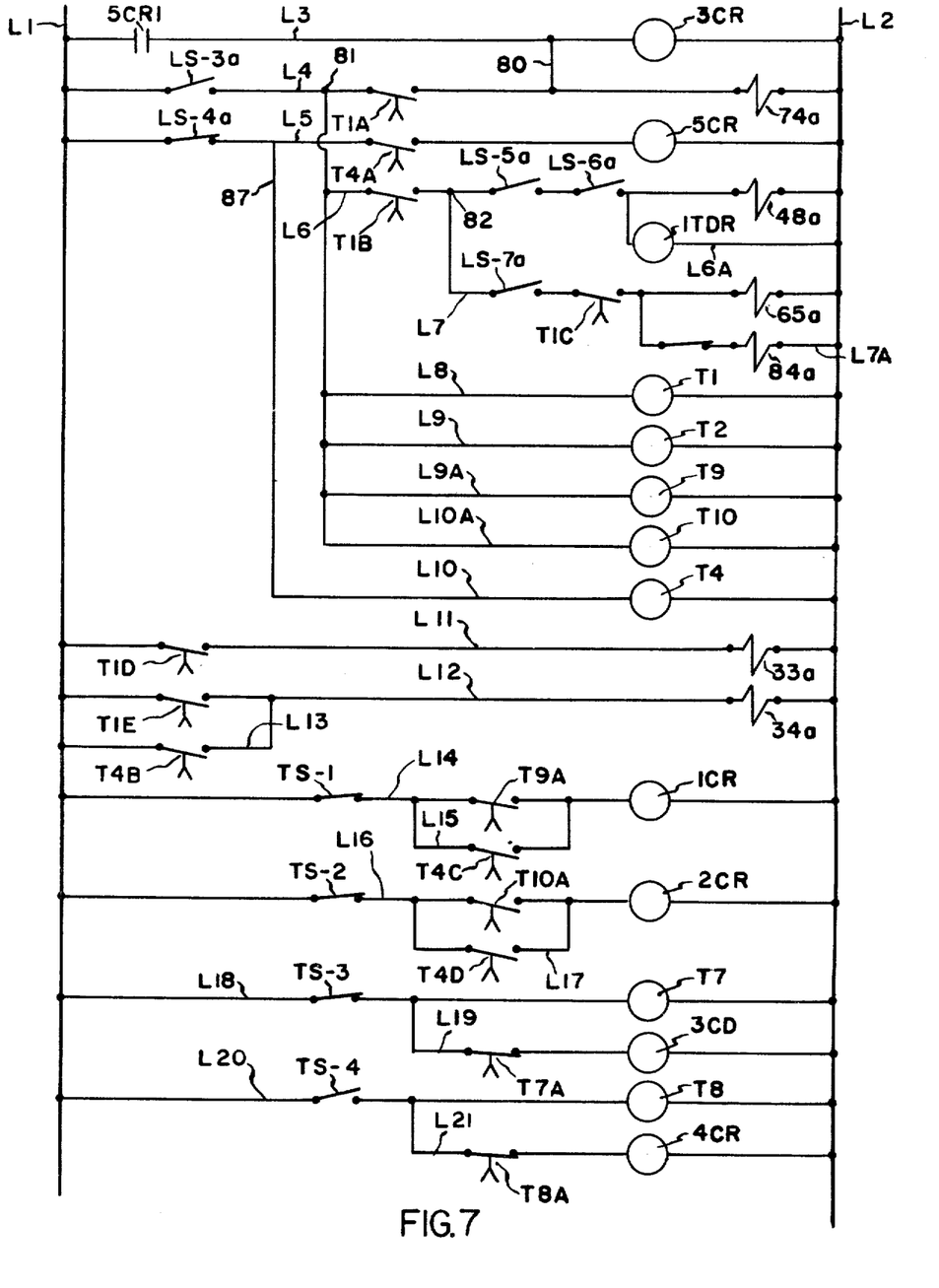
FIGS. 7 and 7A, taken together, comprise a schematic diagram of a typical electrical control circuit for controlling the operation of the various elements of the machine illustrated in FIGS. 1–6.
Figure 7A:
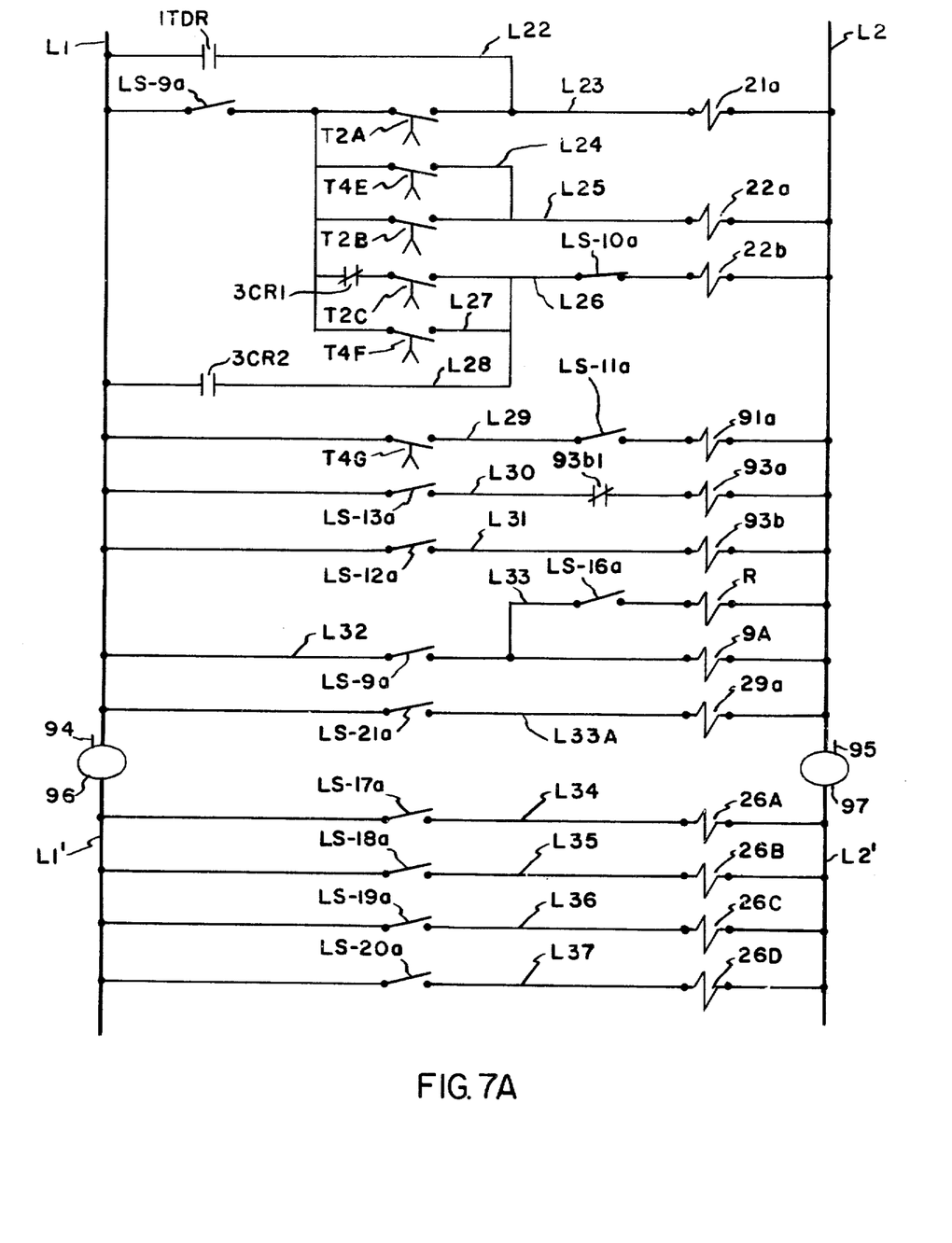

The control circuit for controlling the apparatus previously described is schematically illustrated in FIGS. 7 and 7A, and includes a pair of electrical supply lines L1 and L2 connected across a supply of electrical power such as 110 volt, 60 cycle, altenating current and a plurality of circuit and sub-circuit lines designated L3 through L37, respectively. Connected in line L3 across the lines L1 and L2 are the normally open relay contacts 5CR1, which are closed when a relay 5CR (line L5) is energized, and a control relay 3CR which, when energized, opens a pair of normally closed contacts 3CR1 (line L26) and closes a pair of normally open contacts 3CR2 (line L28). Connected in line L4 across the lines L1 and L2 are the normally closed limit switch contacts LS-3a which are opened when the frame supported limit switch LS-3 is tripped by a paddle 76 on the turntable shaft 10, as is illustrated in FIG. 4. Connected is series with the limit switch contacts LS-3a (line L4) are the normally open timer contacts T1A which close as a timer T1 (line L8) times out, and a rim lock solenoid 74a for moving the piston rod 75 of the rim lock cylinder 74 in such a manner as to move the rim lock 75 to locking position in one of the recesses 77 in the turntable rim 10b. The junction 80a (line L3) of the timer contacts T1A and the rim lock solenoid 74a is also connected to the control relay 3CR via a line 80. Connected in line L5, across the lines L1 and L2, is a set of normally closed limit switch contacts LS-4a which are opened and closed alternately with the contacts LS-3a by the turntable supported paddles 76. Also serially connected in line L5 is a set of normally open timer contacts T4A which close as a timer T4 (line L10) times out, and a holding relay 5CR which, when energized, is operative to close the normally open contacts 5CR1 (line L3).

Connected between the junction 81 (line L4) of limit switch contacts LS-3a and timer contacts T1A (line L4) and the line L2 is a plurality of parallel circuits including lines L6, L8, L9, L9A and line L10A. Line L6 includes the normally open timer contacts T1B which close as the timer T1 (line L8) times out and the normally open limit switch contacts LS-5a, which close when the frame supported limit switch LS-5 is tripped by the upper mold 19 in the fully extended, molding position at the sheet line. Also connected in line L6 is a set of normally open limit switch contacts LS-6a which are closed when the frame supported limit switch LS-6 is tripped by the lower mold 20 in the fully extended position at the sheet line, as is illustrated in FIG. 3. The line L6 also includes the platen lock control solenoid 48a which, when energized, actuates the platen lock control cylinder 48 in such a manner as to rotate the platen lock shafts 43 about their axes to lock the platens 38 and 52 together. Connected in parallel with the platen lock solenoid 48a is a holding relay 1TDR (line L6A) which, when energized, closes a set of normally open holding contacts 1TDR1 (line L22).

Connected in line L7 between the junction 82 (line L6) of timer contacts T1B and limit switch contacts LS-5a (line L6) and the line L2 is a set of normally open limit switch contacts LS-7a which close when the upper platen supported limit switch LS-7 is tripped by the lock shafts 43 and locking lugs 44 moving to the platen locking positions. Connected in series with the limit switch contacts LS-7a (line L7) are the normally open timer contacts T1C which close as the timer T1 (line L8) times out, and a "sheet pinching" solenoid 65a for operating the valve which supplies pressurized air via the tube 66 to the air expansible bellows or bladders 63. This forces the lower mold 20 upwardly, relative to the lower platen 52, toward the mold 19 to pinch the double thickness sheets and provide a single thickness perimetrical portion on the container formed at the forming station 14.

A solenoid 84a (line L7A) for moving the air pressure supplying needle 84 through the sheet in the upper mold and admitting mold pressure thereto is connected in parallel with the solenoid 65a. A pressure responsive switch 86 is connected in series with the solenoid 84 and is set at a pressure of 40 p.s.i., for example, which will interrupt mold pressure and withdraw the needle when the predetermined pressure is reached in the upper mold cavity 35.

Connected in lines L8 and L9 are the vacuum control timer T1 and pressure forming control timer T2, respectively. The timer T1, when energized, sequentially closes the timer contacts T1A (line L4), T1B (line L6), T1C (line L7), T1D (line L11), T1E (line L12). The timer T2, when energized, sequentially closes the normally open timer contacts T2A (line L23), T2B (line L25), and T2C (line L26). The specific sequence of timer contact closing will be more particularly described hereinafter. Connected in line 9A between the junction 81 and line L2 is a timer T9 including normally open timer contacts T9A (line L14) which close as the timer T9 times out. Also connected between the junction 81 (line L4) and the line L2 is a timer T10 (line L10A) which closes the normally open timer contacts T10A (line L16) as it times out.

Connected between the junction 87 (line L5) of the normally closed limit switch contacts Ls-4a (line L5) and timer contacts T4A and line L2 is a circuit line L10, including a timer T4 which sequentially closes the normally open timer contacts T4A (line L5), T4B (line L13), T4C (line L15), T4D (line L17), T4E (line L24), T4F (line L27) and T4G (line L29). The sequence of timer contact closing will be more particularly described hereinafter.

Connected in line L11, across the lines L1 and L2, are the normally open timer contacts T1D and a vacuum control solenoid 33A for communicating forming vacuum to the upper mold 19. Connected in line L12, across the lines L1 and L2, are the normally open timer contacts T1E and the lower vacuum control solenoid 34a for introducing forming vacuum to the lower mold 20.

Connected in line L13, in parallel with the timer contacts T1E, are the normally open timer contacts T4B. Connected in line L14, across the lines L1 and L2, are the normally closed, manually operated, toggle switch TS-1, the normally open timer contacts T9A, which close as the timer T9 (line L9A) times out, and a top heater control relay 1CR which, when energized, operates the top heaters 15 at the first heating station 12. Connected in parallel with timer contacts T9A (line L14) are the timer contacts T4C which close as the timer T4 times out to energize the control relay 1CR (line L14). The timer contacts T4C remain closed for a shorter period of time than do contacts T9A as will be later described. The circuit line 16 is connected across the lines L1 and L2 and includes the control circuitry for the bottom heaters 15 at the first heater station or oven 12. Connected in line L16 is a set of normally closed, toggle switch contacts TS-2, the normally open timer contacts T10A which close as the timer T10 times out, and the oven control relay 2CR which, when energized, causes the bottom quartz heaters 15 at the first heating station 11 to be energized. Connected in line L17 in parallel with the timer contacts T10A is a set of timer contacts T4D (line L17) which are closed as the timer T4 times out.

The control circuitry for controlling the top infra-red heaters 15A at the second heating station or oven 13 is connected in line L18, across the lines L1 and L2, and comprises a normally closed, manually operated, toggle switch TS-3 and a timer T7 which opens a set of normally closed timer contacts T7A (line L19) as the timer T7 times out. Line L19 is connected in parallel with timer T7 and includes the timer contacts T7A connected in series with a bottom heater oven control relay 3CO. When the relay 3CO (line L19) is energized, the top infra-red heating elements 15A at the second heating station 13 or oven are energized.

The control circuitry for the bottom heating elements 15a at the second heating station or over 13 is connected in line L20 across the lines L1 and L2 and comprises a set of normally closed, manually operated toggle switch contacts TS-4 and a timer T8 including a set of normally closed contacts T8A (line L21) which open as the timer T8 times out. The circuit line L21 is connected in parallel with the timer T8 and includes the timer contacts T8 connected in series with a control relay 4CR for energizing the bottom heater elements 15A. The timers T1, T2, T3, T4, T5, T6 T9 and T10 are multiple station, settable, linear timers of the type manufactured by Eagle Manufacturing Company as Model No. HM5-05-A6-02-06 and include separably energized clutches (not shown) as usual. The timers T7 and T8 are also multiple station, linear timers of the same general type, but are settable to intermittently open and close the contacts T7A and T8A for a percentage of the total running time of the timer motors. For example, the timers T7 and T8 typically operate for 120 seconds, but the contacts T7A might only be closed for 108 seconds or 90 percent of the total timing period.

Circuit line L23 is connected across the lines L1 and L2 and includes the control circuitry for lowering the upper mold 19 to the sheet line position and comprises a set of normally closed limit switch contacts LS-9a, which is opened when the rim lock 70 is in the unlocked position to actuate the limit switch LS-9, the normally open timer contacts T2A, which close as the forming timer T2 times out, and an upper mold lowering solenoid 21a which, when energized, directs fluid to the cylinder 21 in such a direction as to move the upper mold 19 to the molding position engaging a sheet on one of the carriages 16. Connected between the junction of the timer contacts T2A (line L23) and the upper mold lowering solenoid 21a and the line L1 is a circuit line L22 including the normally open holding contacts 1TDR1 which are closed when the holding relay 1TDR (line L6A) is closed.

Connected between a junction 90 (line L23) of the limit switch contacts LS-9a and the timer contacts T2A and the line L2 are circuit lines L25 and L26. Circuit line L25 includes the control circuitry for raising the lower mold 20 and comprises the normally open timer contacts T2B which close as the forming timer T2 (line L9) times out, after a shape is molded in one of the thicker sheets, and a solenoid 22a for moving the lower mold 20 upwardly to the mold position illustrated in FIG. 3. Connected in parallel with the timer contacts T2B (line L25) is a set of timer contacts T4E (line L24) which close as the timer T4 (line L10) times out after a shape is molded in one of the thinner sheets.

The circuit for retracting the lower mold 19 is connected in the circuit line L26, across the lines L1 and L2 and includes the normally closed relay contacts 3CR1, which are opened when the relay 3CR (line L3) is energized, the normally open timer contacts T2C which close as the thicker sheet, forming timer T2 times out, the normally closed limit switch contacts LS-10a, which are closed as the platen locks 44 are unlocked to trip the limit switch LS-10, and the lowering solenoid 22b for directing fluid to the cylinder 22 to move the lower mold 20 to the lowered position illustrated in FIG. 5. Connected in line L27, in parallel with the contacts 3CR1 and T2C (line L26), is the set of timer contacts T4F which are closed as the thin sheet timer T4 times out. As will be described more particularly hereinafter, the timer contacts T4E and T4F for the thin sheet timer T4 are closed for a substantially shorter period than the timer contacts T2B and T2C for the thick sheet timer T2 so that the lower mold 20 will dwell at the sheet line position for a longer period when a thick sheet is being formed. Connected between the line L1 and the junction of the timer contacts T2C (line L25) and the limit switch contacts LS-10a is a set of normally open holding contacts 3CR2 which close when the holding relay 3CR (line L3) is energized.

The control circuit for energizing the turntable indexing cylinder 9 is connected in line L9, across the lines L1 and L2, and includes a set of normally open limit switch contacts LS-9a which close when the rim lock 70 is unlocked to trip the limit switch LS-9, and a solenoid 9A for directing fluid to the turntable indexing cylinder 9, to rapidly accelerate the turntable C. A line L33 is connected across the solenoid 9A and includes the normally open limit switch contacts LS-16a, which close when a frame supported limit switch LS-16 is tripped midway through the stroke of the piston rod 9', and a solenoid R which, when energized, interrupts the supply of air to the cylinder 9 so that the piston rod 9' is permitted to "coast" to its fully extended position so that the turntable is not abruptly halted at the end of the piston rod stroke.

A pair of conventional current carrying brushes, schematically designated 94 and 95 (Flg. 7) are connected to the lines L1 and L2 respectively, and engage a pair of slip rings, schematically designated 96 and 97 respectively, connected to a pair of circuit lines L1' and L2' on the turntable C.

Connected across the lines L1' and L2' are circuit lines L34 – L37 for controlling the opening and closing of the clamp frame assemblies 16 supporting the sheets P1 – P4. Connected in the circuit line L34, are a set of normally open limit switch contacts LS-17a, which close when the turntable supported limit switch LS-17 is tripped, and a solenoid 26A which actuates the solenoid actuated, spring returned, clamping frame cylinders 26 on the carriage 16 carrying the sheet P4 to release the sheet P4.

Connected in lines L35 is a set of normally open limit switch contacts LS-18a which close when the turntable supported limit switch LS-18 is tripped, and a solenoid 26B which energizes the clamping frame solenoids 26 to retract the frame members 24 and 25 gripping the sheet P3 and release the sheet P3. Connected in line L36 is a set of normally open limit switch contacts LS-19a, which close when the turntable supported limit switch LS-19 is tripped, and the solenoid 26C for energizing the solenoid actuated, spring returned, clamp frame cylinders 26 on the carriage which supports the sheet P2 to release the sheet P2. Connected in line L37 is a set of limit switch contacts LS-20a, which are closed when the turntable supported limit switch LS-20 is tripped, and a solenoid 26D which, when energized, retracts the clamping frame member 24 and 25 which support the sheet P1 to release the sheet.

Circuit lnes L29, L30, and L31 are connected in parallel across the line L1 and L2 and control the actuation of the limit switches LS-17 through LS-20 at the forming and load-unload stations as will presently be described. A solenoid actuated, spring returned, fluid operated cylinder 91 is mounted on the frame F at the forming station 14 and includes a piston rod 92 which is extendable to trip the turntable supported limit switches LS-17 and LS-19 to release the thin sheets P2 and P4 at the forming station after a shape is formed therein. A double acting, solenoid controlled, fluid pressure operated cylinder 93 is mounted on the frame F at the load-unload station 11 and includes a piston rod 94 extendable to trip the turntable supported limit switches LS-17 through LS-20 at the load-unload station 11. This will open the clamp frame assemblies 16 to release sheets having objects formed therein and prepare the carriage clamp frame assemblies 16 to receive other sheets.

Circuit line L29 includes the normally open timer contact T4G, a set of normally open limit switch contacts LS-11a, which close when a limit switch LS-11 at the forming station 14 is tripped by the lower mold 20 at the forming position, and a solenoid 91a which, when actuated, causes the piston rod 92 of the cylinder 91 to be extended.

Connected in line L30 is a set of normally open limit switch contacts LS-13a, which close when the upper mold 19 extends to mold position to trip the frame supported limit switch LS-13 at the forming station 14, the normally closed limit switch contacts 93b1, which open when a solenoid 93b (line L31) is energized, and a clamp frame opening solenoid 93a for extending the piston rod 94 of the cylinder 93. Connected in line L31 is a set of normally open limit switch contacts LS-12a of a limit switch LS-12, which is tripped when the load table 27 is upwardly extended at the sheet load-unload station 11, and the clamp frame close solenoid 93b for retracting the piston rod 94 of cylinder 93 so that the clamp frame assemblies can be closed at the load-unload station 11.

Circuit line L33A includes a set of normally open limit switch contacts LS-21a, which are closed when a frame supported limit switch is tripped by the frame assemblies 16 opening at the load-unload station 11, connected in series with a solenoid 29a which, when energized, actuates the solenoid actuated, spring returned, fluid pressure operated sheet supply table raising cylinder 29.

THE OPERATION

It will be assumed that the machine is in the midst of its continuous cycle and a sheet P1 is clamped in the clamp frame 16 at the loading-unloading station 11, a sheet P2 is clamped in the clamp frame assembly 16 between the heaters 15 at the oven or heating station 12, a sheet P3 is clamped in a sheet clamp frame assembly 16 at the oven or heating station 13, and a sheet P4 is clamped in a sheet clamp frame 16 at the forming station 14.

Shapes are molded in the lighter gauge sheets P4 and P2 by the lower mold 20, and the shapes are molded in the heavier gauge sheets P1 and P3 by the upper mold 19 as will presently be described. At the time the sheet P4 is initially delivered to the forming station 14, the upper and lower molds 19 and 20 are in the spread, chain line positions, illustrated in FIG. 2. The limit switch LS-3 will have been actuated by one of the paddles 76, as illustrated in FIG. 1, to open the limit switch contacts LS-3a (line L4) while the limit switch contacts Ls-4a (line L5) remain closed to energize the timer T4 (line L10). As the timer T4 times out, the contacts T4E (line L24) will close to energize the lower platen raising solenoid 22a (line L25) for raising the lower platen 52 and lower mold 20 upwardly to the sheet line position, illustrated in FIG. 4, engaging the sheet P4.

The timer contacts T4B (line L13) are set to close at the time the mold 20 engages the sheet P4 to energize the solenoid 34a (line L12) which communicates vacuum to the lower mold cavity 32 to draw the sheet P4 into the lower mold cavity 36 via the suction forces. The timer contacts T4G (line L29) close and the clamp frame opening solenoid 91a (line L29) is energized, via the limit switch contacts LS-11a which were closed when the limit switch LS-11 was tripped by the lower platen 52 being moved to the raised position. When the clamp frame opening solenoid 91a is energized, the cylinder 91, at the forming station 14, is actuated to extend the piston 92 into the path of the limit switch LS-17 and closed the contacts LS-17a (line L34) energizing the solenoid 26a (line L34) which actuates the clamp cylinders 26 on the sheet frame assembly 16 supporting the plastic sheet P4. This releases the sheet P4 for downward movement with the lower mold 20. The lower mold 20 is lowered to the lowered position illustrated in chain lines in FIG. 4, when the timer contacts T4F (line L27) close to energize the solenoid 22b (line L26).

When the lower mold 20 is extended to the raised position, it also trips the frame supported limit switch LS-6 to close the limit switch contacts LS-6a (line L116) and energize, when the timer contacts T4D (line L17) close, the bottom heater oven control relay 2CR. As soon as the bottom mold 20 is retracted, i.e., 10 seconds later, the limit switch LS-6 is deactuated to open the contacts LS-6b and interrupt the relay 2CR (line L16) so that the quartz heaters substantially provide "flash" heat only to the light gauge sheet P2 at the first heating station 12. The heavy gauge sheet P3 at the heating station 13 is heated by the heaters 15a which are energized through the control relay 3CR (line L19) that is intermittently energized through the percentage timer control contacts T7A. Although the heaters 15a are intermittently turned on and off, the heating time is sufficient so that the temperature at the second station 13 does not substantially fluctuate but rather, remains substantially constant.

When the solenoid 22b (line L26) is energized and the lower mold 20 carrying the sheet P4 has been lowered, as mentioned, the timer contacts T4A (line L5) close to energize the relay 5CR (line L5) which closes the contacts 5CR1 (line L3) to energize the rim lock solenoid 74a (line L4) and retract the rim lock arm 70. This actuates the limit switch LS-9 thereby closing the contacts LS-9a (line L33) to energize the turntable rotate solenoid 9A which indexes the turntable C and moves the sheet P3 into the forming station 14 superposed with the now lowered sheet P4. When the turntable indexing rod 9' extends, the limit switch LS-16 is actuated to open the contacts LS-16a and bleed the air pressure off the turntable indexing cylinder 9 so that the piston rod 9 does not abruptly halt, but coasts to its fully extended position.

When the turntable has been indexed 90°, the limit switch LS-4 is deactuated and the limit switch LS-3 is tripped by one of the turntable supported paddles 76 (FIG. 1) to concurrently energize the timers T1, (line L8), T2 (line L9), T9 (line L9A), and T10 (line L10A). The lower mold 20 temporarily dwells in the lowered position, and the upper platen 38 and upper mold 19 are lowered when the timer contacts T2A (line L23) close to energize the top platen lowering solenoid 21a (line L23) which directs pressurized fluid to the cylinder 21 in such a manner as to move the upper mold 19 to the molding position illustrated in FIG. 3. The timer contacts T1D (line L11) then close to energize the top vacuum control solenoid 33a for introducing vacuum to the upper cavity 31 and mold 19 to form a shape in the sheet P3. At the same time, the timer contacts T2B (line L25) close to energize the lower platen raising solenoid 22b which moves the lower platen 52 and the lower mold 20 to the raised molding position so that the lower sheet P4 is engaged by the superposed sheet P3. At the time the sheets P4 and P3 are engaged, the limit switches LS-5 and LS-6 are tripped to close the limit switch contacts LS-5a and LS-6a (line L6). When the lower mold 20 is moved to raised position, the lock shafts 43 and lugs 44 on the upper platen 39 are received in head members 55 on the lower platen 52. When the timer contacts T1B (line L6) close, the platen lock solenoid 48a (line L6) will be energized to actuate the platen lock cylinder 48 and revolve the shafts 43 and the platen locks 44 90° to their locking positions received in the offset slot portions 55b. This provides a positive lock, positively preventing separation of the upper and lower platens 38 and 52, respectively. The locking of the platens is signalled by the actuation of limit switch LS-7 which closes the limit switch contacts LS-7a (line L7). When the timer contacts T1C (line L7) close, the "pressure squeeze" solenoid 65a is energized to actuate the valve 65 which communicates pressurized air to line 66 so that the hoses or expandable air bladders 63, on the lower platen 52, are expanded to the positions illustrated in FIG. 6. This raises the lower mold 20 relative to the platens and tightly squeezes the sheets P4 and P3 around their edges so as to pinch the sheets and reduce the combined thickness of the sheets to the point where a good bond is achieved. The upper and lower molds 19 and 20 remain in the operative positions until the formed object cools. The molds 19 and 20 are then returned to their retracted positions away from the part which is held by the carriage 16 clamping the sheet P3 as will presently be described.

When the limit switch contacts LS-3a (line L4) close, the timers T9 (line L9A) and T10 (line L10A) are energized to close the contacts T9A (line L14) and T10A (line L16) to energize the heater oven control relays 1CR (line L14) and 2CR (line L16) so that the sheet P1 which was indexed to the first heating station or oven 12, is heated by the upper heaters 15 at the first oven 12. The sheet P1, now at the first heating station 12, is a heavy gauge sheet so the contacts T9A (line L14) and T10A (line L16) remain closed for a substantially longer period than the timer contacts T4C (line L15) and T4C (line L17) were closed so that the heavier gauge sheet P1 will be heated by both upper and lower heaters 15 for a relatively lower period of time than the lighter gauge sheet P2 was previously heated by the second oven 12. The light gauge plastic sheet P2, which is now indexed to the second heating station 13, is also heated by the heaters 15a that are intermittently energized as previously described to maintain a substantially constant temperature at the station 13.

More particularly, when the top platen 58 is extended, the timer T8 (line L20) is energized to intermittently open and close the contacts T8A to energize the relay 4CR which selectively controls the energization of the lower heaters at the second oven 13. The temperature at the oven or heating station 13 can be controlled by adjusting the timer T7 and regulate the percentage of the timer operating time that the contacts T7A and T7B are closed. Although the heaters 15a at the second oven are intermittently energized, the heat does not substantially fluctuate. The lighter gauge sheets P2 and P4, which are "flash" heated only by the heaters 15 at the first heating station 12, are heated for a longer period of time by both top and bottom heaters at the second station 12.

A typical cycle time to complete the formation of the part at forming station 14 is 4 minutes. Once the part has been assembled and the carrier C is indexed, the operator at station 11 must unload the completed part and reload a heavier gauge sheet in 10 seconds. Thus, while the parts may typically be heated for 4 minutes, the two sheets which are assembled to make a part are in the heater units a total of 4 minutes and 10 seconds. Neither will be heated during the entire length of time. The thinner gauge sheet obviously will be heated for a lesser period of time than the thicker gauge sheet. About three minutes heating time is required for the thicker gauge sheet, and about two minutes heating time is required for the thinner gauge sheet, and this is accomplished by delaying the turning on of the quartz tubes 15 with the timers T7 and T8.

When the turntable C was rotated 90° to move the heavier gauge sheet P3 to the forming station 14, the carriage 16, which previously supported sheet P4, was moved to the load station 11 to actuate the limit switch LS-13 and close the limit switch contacts LS-13a (line L30) to energize the clamp frame opening solenoid 93a which actuates the unclamp cylinder 93 at the load-unload station 11. This extends the piston 94 into the path of the limit switch LS-17 to close the limit switch contacts LS-17a (line L34). This energizes the solenoid 26A (line L34), causing the clamp frame assembly 16 previously supporting the sheet P4, to be opened. When the clamp frame assembly 16 is opened at the load station, the limit switch LS-21 (FIG. 2) is tripped to close the limit switch contacts LS-21a (line L33a) to energize the table raising solenoid 29a (line L33A) and move the sheet support table 27 upwardly to a position in which the next sheet is received by the carriage previously supporting sheet P4. When it reaches the proper position, the limit switch LS-12 is tripped to close limit switch contacts LS-12a (line L31) and energize the solenoid 93b. This causes the piston rod 94 on the cylinder 93 to be retracted and deactuates the limit switch LS-17a so that the clamp frame solenoid 26a (line L34) can be deenergized and the frame assembly 16 returned to its original clamping position.

After the sheets P4 and P3 are fused together and the hollow part is formed, the forming cycle is reversed and the timer contacts T1C (line L7) open to deenergize the pressure squeeze solenoid 84a so that the air bladders 63 collapse. The timer contacts T1B (line L6) open to deenergize the platen lock solenoid 48a (line L6) permitting the platen locking lugs 44 to be disposed in alignment with the keyhole slot 55a. Also, the timer contacts T1D (line L11) and T1E (line L12) open to deenergize vacuum control relays 33a and 34a and remove the vacuum from the top and bottom molds. The timer contacts T2A (line L23) open to deenergize the upper platen lowering solenoid 21a permitting the upper mold 19 to be spring-returned to the raised position, and the contacts T2C (line L26) close to energize the lower mold lowering solenoid 22b.

The lower sheet P4 will be bonded to the upper sheet P3 to be carried thereby in the clamp frame assembly holding the sheet P3. If necessary, conventional air ejection devices may be mounted on the top and bottom molds to assist in removing plastic sheets which inadvertently stick to the molds. The top sheet with the part formed therein, separates from the top mold and the bottom sheet P4 separates from the bottom mold to be carried by the clamp frame assembly holding the sheet P3.

With the part thus formed, the timer contacts T1A time out to energize the rim lock retract solenoid 74a which retracts the rim lock 70 to actuate the limit switch LS-9. This closes the limit switch contacts LS-9A (line L33) and again energizes the turntable rotating solenoid 9A (line L33). This causes the turntable C to be indexed 90° so that the formed part is now disposed at the loading-unloading station. This will trip the limit switch LS-13 causing the contacts LS-13a (line L30) to again close and energize the clamp frame opening solenoid 93a which opens the clamp frame 16 supporting the part. The operator manually removes the part and at the same time, the limit switch LS-21 is tripped to cause the next sheet on the turntable 27 to be raised into position to be clamped by the clamp frame previously holding the sheet P3. When the sheet reaches the raised position, the limit swich LS-12 is again tripped to close the contacts LS-12a (line L31) to energize the clamp frame solenoid 93b and clamp the sheet on the carriage 16 to be indexed therewith to the heating station 11. The cycle is then repeated.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What is claimed is:

1. Apparatus for forming hollow objects from first and second thermoplastic sheets wherein the amount of heat required to bring a first sheet to its forming temperature differs substatially from the amount of heat required to bring a second sheet to its forming temperature, said apparatus comprising heating means, diferential pressure, mold forming means located at a forming station adjacent said heating means, carrier means for advancing first and second sheets in uniformly spaced alternate succession in intermittent step-by-step movement along a fixed path with each first sheet being located one step in advance of a second sheet, said carrier means carrying said sheets in succession into operative relationship with said heating means and subsequently advancing said sheets in succession into operative relationship with said forming means at said forming station while pausing for a predetermined time interval between successive steps of movement to accommodate heating and forming of said sheets while said sheets are at said heating means and forming station, means at said forming station operable on alternate steps of movement of said carrier means to transfer a first sheet from said carrier means to said forming means within said predetermined time interval between a first step of movement of said carrier means and its next step of movement and operable after said next step of movement of said carrier means advances a second sheet into operative relationship with said forming means to actuate said forming means to form said object within the predetermined time interval between said next step of movement and the next subsequent step of movement, and first heater control means responsive to the arrival of a first sheet at said heating means for operating said heating means to supply a first amount of heat to said first sheet within said predetermined time interval and responsive to the arrival of a second sheet at said heating means for operating said heating means to supply a second amount of heat, differing from said first amount of heat, to said second sheet within said predetermined time interval.

2. Apparatus as defined in claim 1 wherein said heating means comprises a first and a second heater at said heating station spaced along said fixed path by a distance corresponding to the length of one step of movement of said carrier means whereby a sheet on said carrier means is located in operative relationship with said first heater at the conclusion of one step of movement of said carrier means and in operative relationship with said second heater at the conclusion of the next successive stop of movement of said carrier means, said heater control means controlling operation of said first heater, and second heater control means for operating said second heater to supply equal amounts of heat to first and second sheets advanced into operative relationship therewith.

3. Apparatus as defined in claim 1 wherein said forming station is spaced from said second heater by a distance corresponding to one step of movement of said carrier means and said second control means operates said second heater to maintain a substantially constant termperature in the region occupied by sheets in operative relationship with said second heater.

* * * * *

UNITED STATES PATENT AND TRADEMARK OFFICE
CERTIFICATE OF CORRECTION

PATENT NO. : 3,925,140  
DATED : December 9, 1975  
INVENTOR(S) : Gaylord W. Brown Page 1 of 2

It is certified that error appears in the above-identified patent and that said Letters Patent are hereby corrected as shown below:

```
Column 1, line 16, change "two" to --twin--.
Column 1, line 28, change "on" to --one--.
Column 1, line 35, change "," to --.--.
Column 3, line 39, change "heatng" to --heating--.
Column 4, line 15, change "heatinng" to --heating--.
Column 4, line 41, change "particulalry" to --particularly--.
Column 4, line 50, change "incldes" to --includes--.
Column 6, line 11, insert quotation marks around "platen lock".
Column 6, line 13, insert quotation marks around "rim lock".
Column 6, line 16, insert quotation marks around "platen unlock".
Column 6, line 24, insert quotation marks around "load table
                   extend".
Column 6, line 34, change "llimit" to --limit--.
Column 6, line 51, change "altenating" to --alternating--.
Column 8, line 11, change "Ls-4a" to --LS-4a--.
Column 8, line 35, after "with" insert --the--.
Column 8, line 65, change "over" to --oven--.
Column 10, line 22, change "FIg." to --FIG.--.
Column 10, line 37, change "lines" to --line--.
Column 10, line 52, change "member" to --members--.
Column 10, line 54, change "lnes" to --lines--.
Column 11, line 57, change "Ls-4a" to --LS-4a--.
Column 12, line 18, change "LS-6a" to --LS-6b--.
Column 12, line 41, after "LS-9" insert --,--.
Column 13, line 8, change "39"to --38--.
Column 13, line 45, change "T4C" to --T4D--.
Column 13, line 47, change "lower" to --longer--.
Column 14, line 48, insert quotation marks around "pressure
                    squeeze".
Column 15, line 38, change "diferen-" to --differen---.
```

UNITED STATES PATENT OFFICE
CERTIFICATE OF CORRECTION

Patent No. 3,925,140    Dated December 9, 1975

Inventor(s) Gaylord W. Brown

It is certified that error appears in the above-identified patent and that said Letters Patent are hereby corrected as shown below:

Column 16, line 34, change "stop" to -- step --.

Column 16, line 45, change "termperature" to -- temperature --.

Signed and Sealed this fourth Day of May 1976

[SEAL]

Attest:

RUTH C. MASON
Attesting Officer

C. MARSHALL DANN
Commissioner of Patents and Trademarks